United States Patent
Nabe et al.

(10) Patent No.: US 9,855,846 B2
(45) Date of Patent: Jan. 2, 2018

(54) SWITCH DEVICE AND VEHICLE SWITCH DEVICE

(71) Applicants: KABUSHIKI KAISHA TOKAI RIKA DENKI SEISAKUSHO, Aichi (JP); Mazda Motor Corporation, Hiroshima (JP)

(72) Inventors: Yoshiaki Nabe, Aichi (JP); Susumu Mega, Aichi (JP); Hiroki Danjoh, Hiroshima (JP); Taro Oike, Hiroshima (JP); Keiichirou Yamamoto, Hiroshima (JP)

(73) Assignees: KABUSHIKI KAISHA TOKAI RIKA DENKI SEISAKUSHO, Aichi (JP); MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/210,212

(22) Filed: Jul. 14, 2016

(65) Prior Publication Data
US 2017/0025236 A1    Jan. 26, 2017

(30) Foreign Application Priority Data
Jul. 22, 2015 (JP) .................. 2015-144652

(51) Int. Cl.
| | |
|---|---|
| H01H 23/12 | (2006.01) |
| B60K 37/06 | (2006.01) |
| H01H 23/14 | (2006.01) |
| H01H 23/30 | (2006.01) |
| H01H 25/04 | (2006.01) |

(52) U.S. Cl.
CPC ........... B60K 37/06 (2013.01); H01H 23/143 (2013.01); H01H 23/30 (2013.01); H01H 25/04 (2013.01); H01H 2217/004 (2013.01); H01H 2231/026 (2013.01)

(58) Field of Classification Search
CPC ...... B60K 37/06; H01H 23/143; H01H 23/30; H01H 25/04; H01H 2217/004; H01H 2231/026
USPC .................. 200/61.54, 5 A, 6 A, 5 R, 61.57; 74/484 R
See application file for complete search history.

(56) References Cited

U.S. PATENT DOCUMENTS

| | | | | |
|---|---|---|---|---|
| 4,126,827 | A * | 11/1978 | Negrini | ..................... H04R 1/08 200/61.54 |
| 5,923,010 | A * | 7/1999 | Khoury | .................. B60Q 1/425 200/61.27 |
| 7,623,116 | B1 * | 11/2009 | Bidiville | ............... G06F 3/0362 200/5 A |
| 2014/0102866 | A1 | 4/2014 | Miyasaka | |

FOREIGN PATENT DOCUMENTS

JP    2013-196761 A    9/2013

* cited by examiner

*Primary Examiner* — Edwin A. Leon
(74) *Attorney, Agent, or Firm* — Roberts Mlotkowski; Safran Cole & Calderon P.C.

(57) ABSTRACT

A switch device includes a push switch including first and second push portions that are parallel arranged, and an operating switch arranged between the first and second push portions and including a switch operation direction different from a switch operation direction of the first and second push portions. The operating switch protrudes from an operation surface of the first and second push portions so as to allow the first and second push portions to be individually recognized when operating the push switch.

12 Claims, 4 Drawing Sheets

SWITCH DEVICE AND VEHICLE SWITCH DEVICE

The present application is based on Japanese patent application No. 2015-144652 filed on Jul. 22, 2015, the entire contents of which are incorporated herein by reference.

BACKGROUND OF THE INVENTION

1. Field of the Invention

The invention relates to a switch device and a vehicle switch device using the switch device.

2. Description of the Related Art

A steering switch device is known which has plural switches provided on a spoke portion of a steering wheel of a vehicle (see e.g. JP-A-2013-196761). The vehicle switch device is configured as a push switch on which plural operating knobs are arranged. In detail, the steering switch device as a vehicle switch device is configured such that a first operating knob having an operation surface push-operable obliquely upward on the near side are adjacent to a second operating knob having an operation surface tilt-operable toward substantially the rear side of the vehicle. The first and second operating knobs are arranged such that the respective surfaces are smoothly continuous with each other with a very small gap in-between and form, as a whole, a continuous surface from an upper surface (i.e., a surface facing a driver) to a side surface (i.e., a surface on the near side of the driver) of the steering wheel.

Then, for example, the first operating knob also has a configuration in which plural operating knobs constituting the first operating knob are adjacently arranged with very small gaps in-between. This allows many operating knobs to be arranged within an operable range of a finger/thumb of the driver who is holding a ring portion of the steering wheel, and it is therefore possible to arrange a number of operating knobs without impairing operability. In addition, since the steering switch device in this form is configured such that the first operating knob is supported so as to be push-operable and also the second operating knob is supported by a shaft so as to be tilt-operable, the driver can perform both the push operation of the first operating knob and the tilt operation of the second operating knob by a finger/thumb without difficulty while holding the ring portion and better operability is guaranteed.

SUMMARY OF THE INVENTION

The vehicle switch device in JP-A-2013-196761 may need to provide a separator between the switches for distinguishing the adjacent switches so as to prevent incorrect operations. Thereby, problems may arise that the separator needs an additional manufacture process therefor and causes lowering in operability instead of preventing the incorrect operations.

It is an object of the invention to provide a switch device that allows the adjacent switches to be easily distinguished and is excellent in operability, as well as a vehicle switch device using the switch device.

(1) According to an embodiment of the invention, a switch device comprises:

a push switch comprising first and second push portions that are parallel arranged; and an operating switch arranged between the first and second push portions and comprising a switch operation direction different from a switch operation direction of the first and second push portions, wherein the operating switch protrudes from an operation surface of the first and second push portions so as to allow the first and second push portions to be individually recognized when operating the push switch.

In the above embodiment (1) of the invention, the following modifications and changes can be made.

(i) The first and second push portions define a portion or an entirety of a U-shaped operational area, and wherein the operating switch is arranged in the U-shaped operational area.

(ii) The operational area comprises the first and second push portions parallel arranged and a third push portion arranged opposite the first and second push portions in relation to the operating switch.

(iii) The operating switch comprises a toggle switch.

(iv) The switch operation direction of the first and second push portions is substantially perpendicular to the switch operation direction of the operating switch.

(v) The first and second push portions are separated from each other by a linear groove, and wherein the protrusion of the operating switch extends along the groove.

(vi) The first and second push portions have a same width in a direction orthogonal to an extension direction of the groove.

(vii) The protrusion of the operating switch is arranged in the groove.

(2) According to another embodiment of the invention, a vehicle switch device comprises: the switch device according to the above embodiment (1); and a fixing part by which the switch device is attached to a spoke portion of a steering wheel.

Effects of the Invention

According to an embodiment of the invention, a switch device can be provided that allows adjacent switches to be easily distinguished and are excellent in operability, as well as a vehicle switch device using the switch device

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

First Embodiment of the Invention

A switch device 1 in the first embodiment of the invention has a push switch 10 composed of first and second push portions 11 and 12 which are arranged side by side. An operating switch 20 to be operated in a different direction from the operation direction of the push switch 10 protrudes from between the first and second push portions 11 and 12. Thus, the operating switch 20 serves as a separator between the first and second push portions 11 and 12 so that the first and second push portions 11 and 12 can be recognized separately. As such, the switch device 1 is configured such that it is easy to distinguish switches arranged side by side and operability thus can be improved.

The switch device 1 has the push switch 10 composed of the first and second push portions 11 and 12 arranged side by side and the operating switch 20 arranged between the first and second push portions 11 and 12 and operated in a different direction from the operation direction of the first and second push portions 11 and 12, and is configured such that the operating switch 20 protrudes beyond operation surfaces of the first and second push portions 11 and 12 so that the first and second push portions 11 and 12 can be recognized separately when operating the push switch 10.

Push Switch 10

Figure 1:
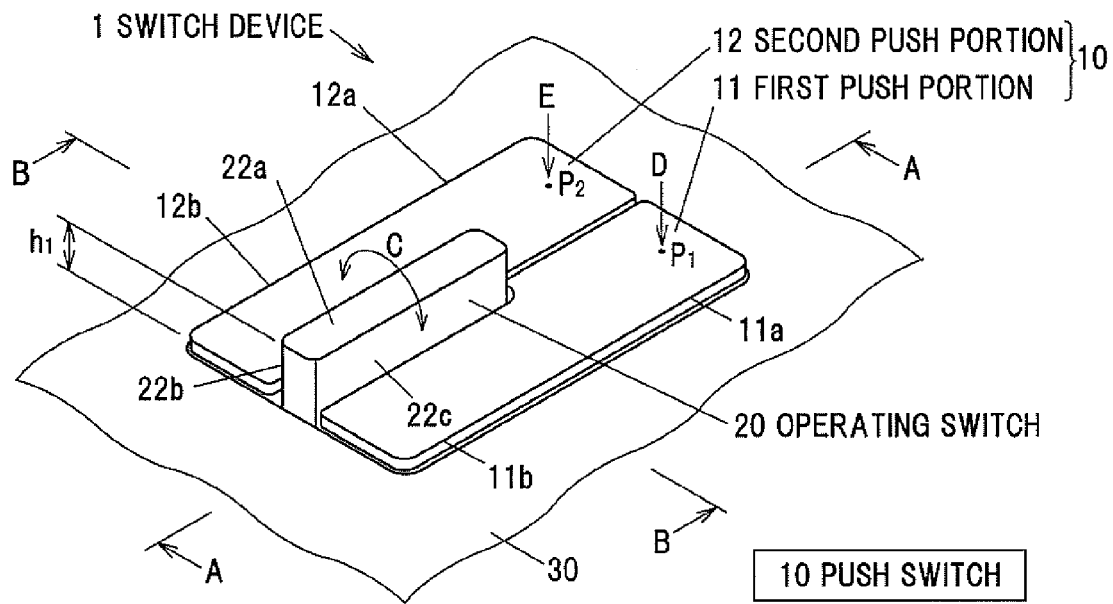
FIG. 1 is an overall perspective view showing a switch device in a first embodiment of the present invention.
Figure 2A:
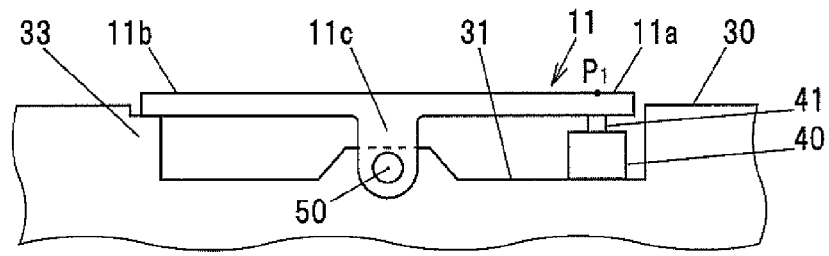
FIG. 2A is a cross sectional view showing the switch device taken along a line A-A in FIG. 1.
Figure 2B:
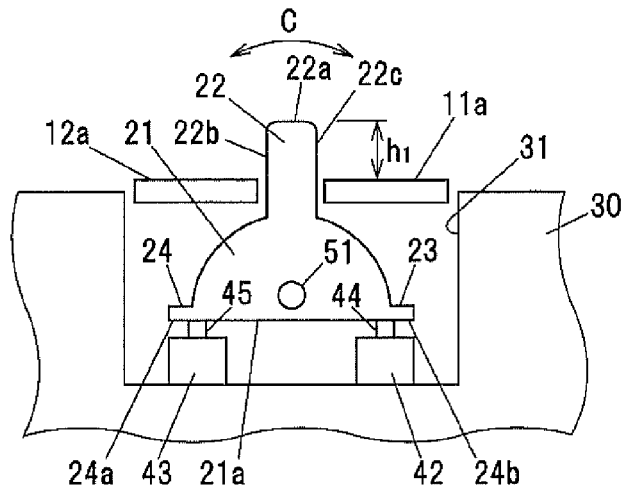
FIG. 2B is a cross sectional view showing the switch device taken along a line B-B in FIG. 1.

FIG. 1 is an overall perspective view showing a switch device in the first embodiment of the invention. FIG. 2A is a cross sectional view showing the switch device taken along the line A-A in FIG. 1 and FIG. 2B is a cross sectional view showing the switch device taken along the line B-B in FIG. 1.

The push switch 10 is composed of the first push portion 11 and the second push portion 12 which are arranged side by side, as described above. As shown in FIG. 2A, the first push portion 11 is composed of a first plate portion 11a including a push point $P_1$, a center portion 11c to be the center of rotation when operating the switch, and a second plate portion 11b formed opposite to the first plate portion 11a with respect to the center portion 11c. The first plate portion 11a and the second plate portion 11b are flat operation surfaces which form an operational area. The first push portion 11 can be formed of a resin such as ABS, PC or POM, or a metal material such as aluminum. Since the first push portion 11 and the second push portion 12 has the same configuration, only the first push portion 11 will be described below.

As shown in FIG. 2A, the first push portion 11 is housed, together with the second push portion 12 and the operating switch 20, in an opening 31 of a housing 30 so that the first plate portion 11a is operably exposed. The first plate portion 11a and the second plate portion 11b are supported rotatably around a rotation center shaft 50 provided in the center portion 11c. When the push point $P_1$ of the first plate portion 11a is pressed in a direction D, the first plate portion 11a rotationally moves downward. In the first embodiment, the second plate portion 11b butts against an edge 33 of the opening 31 and thus cannot be push-operated.

A tact switch 40 is arranged and fixed in the opening 31 under the first plate portion 11a. A moving part 41 of the tact switch 40 is close to or in contact with the lower portion of the first plate portion 11a, and a push operation on the push point $P_1$ causes the moving part 41 to move and thereby turns on/off the tact switch 40.

Operating Switch 20

As shown in FIGS. 1 and 2B, the operating switch 20 is arranged between the first push portion 11 and the second push portion 12. The operating switch 20 is an operating switch to be operated in a different direction from the operation direction of the push switch 10 and is, e.g., a toggle switch which is pivotably (rockably) operated in a direction C. The operating switch 20 can be formed of a resin such as ABS, PC or POM, or a metal material such as aluminum.

The operation direction of the operating switch 20 is different from the operation direction of the push switch 10. In detail, the operation direction of the operating switch 20 is different from the downward direction which is the operation direction of the push switch 10 and is indicated as directions D and E in FIG. 1. As a result, the operation of the operating switch 20 is not confused with the operation of the push switch 10 and this prevents incorrect operations.

The operating switch 20 serves as a separator between the first and second push portions 11 and 12. The operating switch 20 protrudes so that an upper surface 22a thereof is located a distance h1 (>0) above the upper surfaces of the first plate portion 11a and the second plate portion 11b of the first push portion 11, thereby allowing the first and second push portions 11 and 12 to be recognized separately. Likewise, the upper surface 22a of the operating switch 20 is located the distance h1 (>0) above upper surfaces of a first plate portion 12a and a second plate portion 12b of the second push portion 12. The distance h1 is, e.g., 5 mm, but may be any protrusion length as long as it allows the operating switch 20 to serve as a separator between the first and second push portions 11 and 12 or the first and second push portions 11 and 12 to be recognized separately.

As shown in FIG. 2B, the operating switch 20 is composed of a knob 22 for toggle operation, a main body 21 supporting the knob 22 in a protruding manner and having a rotating shaft 51 allowing rotation with respect to the housing 30, and edge portions 23 and 24 formed on both sides of the main body 21. The operating switch 20 is housed in the opening 31 of the housing 30 so that the knob 22 is operably exposed and is located above the first plate portions 11a and 12a and the second plate portions 11b and 12b.

As long as the push switch 10 can be push-operated, the knob 22 of the operating switch 20 may protrude either in a portion of the region between the first push portion 11 and the second push portion 12 as shown in FIG. 1 or in the entire region between the first push portion 11 and the second push portion 12.

Tact switches 42 and 43 are arranged and fixed under the edge portions 23 and 24 formed on the both sides of the main body 21. Moving parts 44 and 45 of the tact switches 42 and 43 are close to or in contact with the lower portions of the edge portions 23 and 24, and a rotation operation of the knob 22 causes the edge portions 23 and 24 to move and thereby turns on/off the tact switches 42 and 43. That is, the knob 22 is rotated clockwise by pushing an operation surface 22b with a finger, etc., to turn on/off the tact switch 42, and is rotated counterclockwise by pushing an operation surface 22b with a finger, etc., to turn on/off the tact switch 43.

Effects of the First Embodiment

The switch device 1 in the first embodiment is configured such that the first and second push portions 11 and 12 of the push switch 10 are arranged side by side and the operating switch 20 to be operated in a different direction from the operation direction of the push switch 10 protrudes from between the first and second push portions 11 and 12. Thus, the operating switch 20 serves as a separator between the first and second push portions 11 and 12 so that the first and second push portions 11 and 12 can be recognized separately. As a result, it is possible to provide a switch device and a vehicle switch device which allow adjacent switches to be easily distinguished and are excellent in operability. In addition, the configuration described above allows many switches to be arranged compactly in one place.

Second Embodiment of the Invention

A switch device 100 in the second embodiment of the invention is configured such that first and second push portions 111 and 112 define a portion or an entirety of a U-shaped operational area and, an operating switch 200 is arranged in the U-shaped operational area. The operational area is composed of the first and second push portions 111 and 112 parallel arranged and a third push portion 113, provided opposite to the first and second push portions 111 and 112 in relation to the operating switch 200.

Push Switch 110

Figure 3:
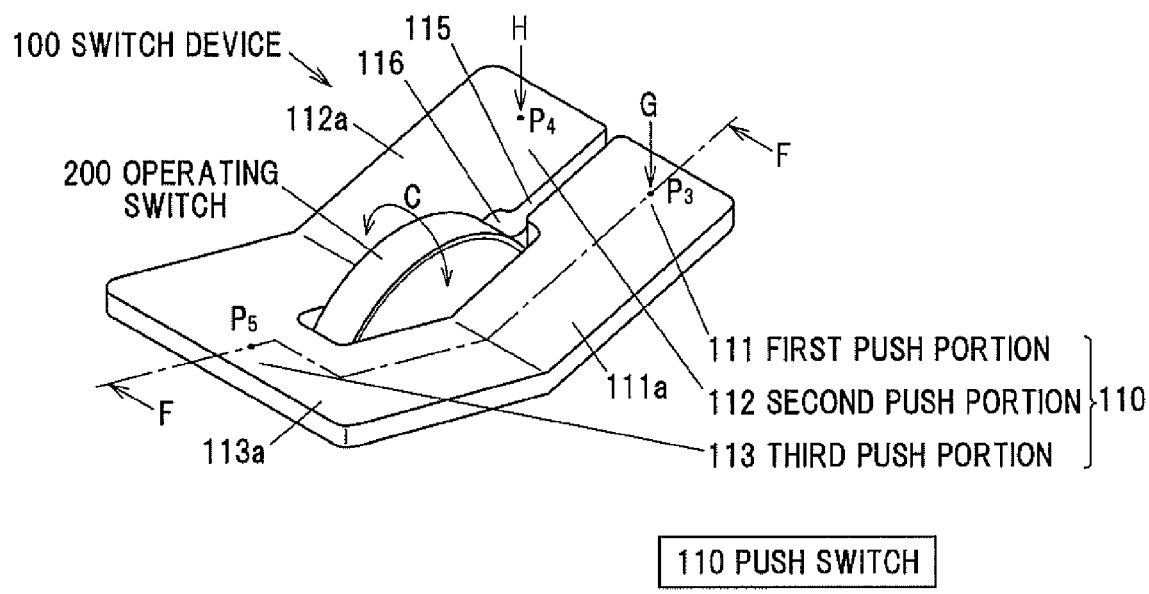
FIG. 3 is an overall perspective view showing a switch device in a second embodiment of the invention.
Figure 4:
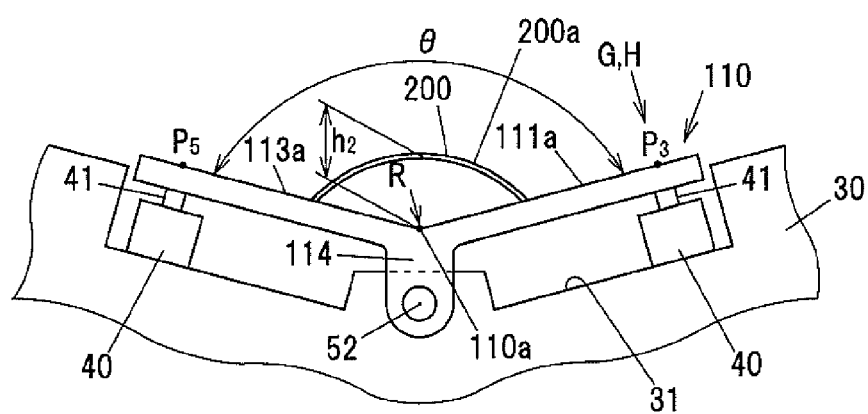
FIG. 4 is a cross sectional view showing the switch device taken along a line F-F in FIG. 3.

FIG. 3 is an overall perspective view showing a switch device in the second embodiment of the invention. FIG. 4 is a cross sectional view showing the switch device taken along the line F-F in FIG. 3.

A push switch 110 has the first push portion 111 and the second push portion 112 which are arranged side by side, in the same manner as the first embodiment. The first push portion 111 is coupled to the second push portion 112 by the third push portion 113. A groove 115 is formed between the first push portion 111 and the second push portion 112, and a wide groove 116 is formed between the first push portion 111 and the second push portion 112 and the third push portion 113. In the wide groove 116, the operating switch 200 can be arranged so that a toggle operation can be performed in the direction C. The push switch 110 can be formed of a resin such as ABS, PC or POM, or a metal material such as aluminum.

As shown in FIG. 4, the first push portion 111 and the second push portion 112 are connected to the third push portion 113 at a predetermined angle θ. The predetermined angle θ is, e.g., 130°. A central portion 114 is formed in the middle at which the first push portion 111 and the second push portion 112 are connected to the third push portion 113. The first push portion 111, the second push portion 112 and the third push portion 113 are supported on the housing 30 by a rotation center shaft 52 provided in the central portion 114 so as to be pivotable (rockable) about the rotation center shaft 52.

A depression in which the first push portion 111 and the second push portion 112 meet the third push portion 113 in FIG. 3 is a valley portion 110a having a circular arc shape with a radius R of, e.g., 8 mm.

The tact switches 40 are arranged and fixed in the opening 31 respectively under the first push portion 111, the second push portion 112 and the third push portion 113. The moving parts 41 of the tact switches 40 are close to or in contact with the respective lower portions of the first push portion 111, the second push portion 112 and the third push portion 113, and push operations on push points $P_3$, $P_4$ and $P_5$ cause the respective moving parts 41 to move and thereby turn on/off the respective tact switches 40.

Operating Switch 200

As shown in FIG. 3, the operating switch 200 is arranged between the first push portion 111 and the second push portion 112. The operating switch 200 is an operating switch to be operated in a different direction from the operation direction of the push switch 110 and is, e.g., a toggle switch which is pivotably (rockably) operated in the direction C, in the same manner as the first embodiment. The operating switch 200 can be formed of a resin such as ABS, PC or POM, or a metal material such as aluminum.

The operation direction of the operating switch 200 is different from the operation direction of the push switch 110. In detail, the operation direction of the operating switch 200 is different from the substantially downward direction which is the operation direction of the push switch 110 and is indicated as directions G and H in FIG. 3. As a result, the operation of the operating switch 200 is not confused with the operation of the push switch 110 and this prevents incorrect operations.

The operating switch 200 serves as a separator between the first and second push portions 111 and 112. The operating switch 200 protrudes so that an upper surface 200a thereof is located at a distance h2 (>0) from the valley portion 110a, thereby allowing the first and second push portions 111 and 112 to be recognized separately. In other words, the operating switch 200 protrudes beyond an operation surface 111a of the first push portion 111 and an operation surface 112a of the second push portion 112. The distance h2 is, e.g., 4.5 mm, but may be any protrusion length as long as it allows the operating switch 200 to serve as a separator between the first and second push portions 111 and 112 or the first and second push portions 111 and 112 to be recognized separately.

The first push portion 111 and the second push portion 112 define an operational area for push operation. The first and second push portions 111 and 112 define a portion or an entirety of the U-shaped operational area as shown in FIG. 3, and the operating switch 200 is arranged in the U-shaped operational area. In the example shown in FIG. 3, the first and second push portions 111 and 112 define a portion of the U-shaped operational area and the operating switch 200 is arranged in the U-shaped operational area. Alternatively, the first and second push portions 111 and 112 may define the entirety of the U-shaped operational area in which the operating switch 200 is arranged, even though it is not illustrated.

As shown in FIG. 3, the operational area is composed of the first push portion 111, the second push portion 112, and the third push portion 113 which is provided opposite the first and second push portions 111 and 112 in relation to the operating switch 200. The first push portion 111, the second push portion 112 and the third push portion 113 define the U-shaped operational area and the operating switch 200 is arranged in the U-shaped operational area.

Effects of the Second Embodiment

The switch device 100 in the second embodiment is configured such that the first and second push portions 111 and 112 define a portion or the entirety of the U-shaped operational area and the operating switch 200 is arranged in the U-shaped operational area. The operational area is composed of the first and second push portions 111 and 112 parallel arranged and the third push portion 113 provided opposite the first and second push portions 111 and 112 in relation to the operating switch 200. The operating switch 200 protrudes from the operation surface 111a of the first push portion 111 and the operation surface 112a of the second push portion 112 which define the U-shaped operational area. Since the operating switch 200 serves as a separator, the first and second push portions 111 and 112 can be recognized separately, this allows a push operation to be performed without performing incorrect operation, and operability of push operation is thus improved. In addition, since the valley portion 110a as a depression in which the first push portion 111 and the second push portion 112 meet the third push portion 113 is formed to have a circular arc shape, it is possible to eliminate a corner coming into contact with a fingertip and thereby to provide a switch device excellent in operability without risk of injury. In addition, by using the operating switch 200 as a separator, it is possible to provide a switch device which can prevent incorrect operations without requiring an extra structure.

Third Embodiment of the Invention

Figure 5A:
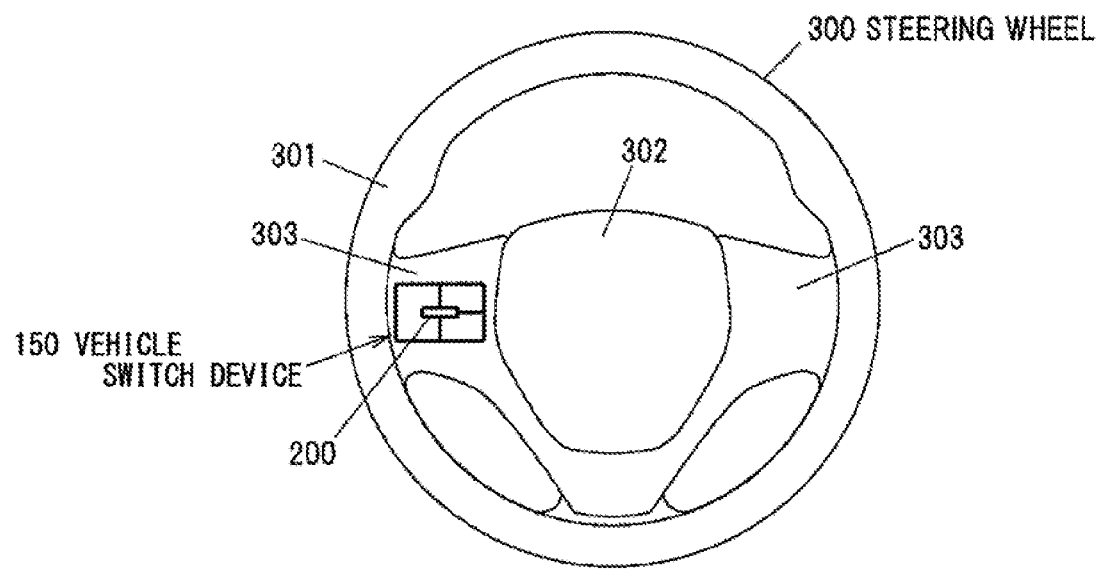
FIG. 5A is a front view showing a steering wheel mounting a vehicle switch device in a third embodiment which is the switch device in the second embodiment used as a vehicle switch device and is mounted on the steering wheel.
Figure 5B:
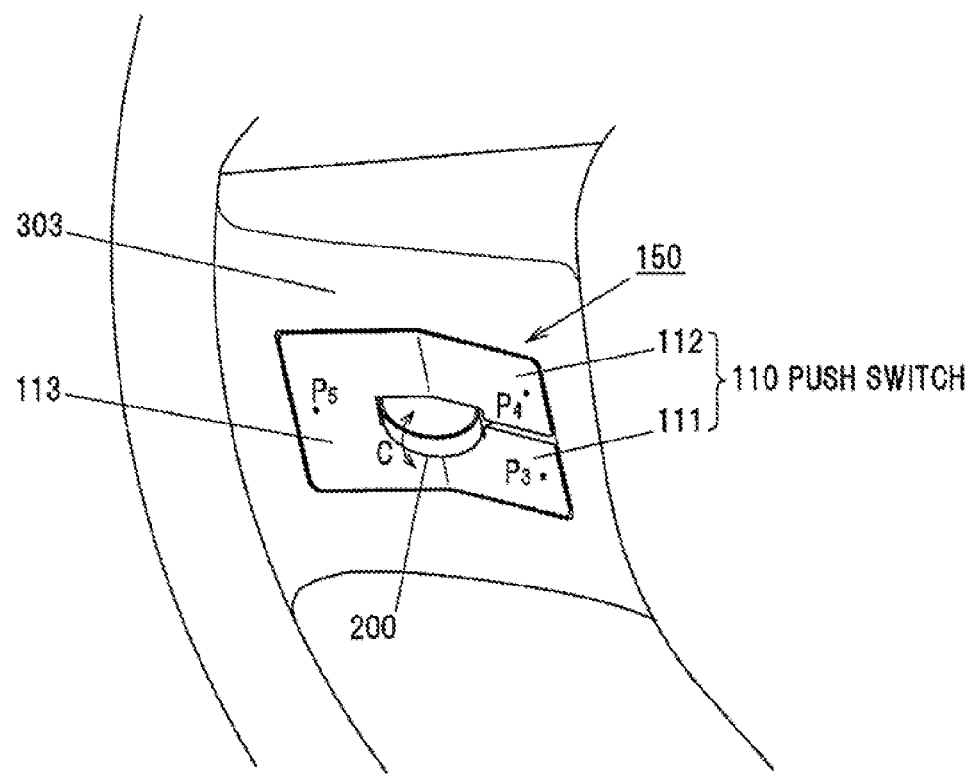
FIG. 5B is an enlarged detailed view showing a portion mounting the vehicle switch device of FIG. 5A as viewed from slightly above the eye level of a driver.

FIG. 5A is a front view showing a steering wheel mounting a vehicle switch device in the third embodiment which is the switch device in the second embodiment used as a vehicle switch device and is mounted on the steering wheel, and FIG. 5B is an enlarged detailed view showing a portion mounting the vehicle switch device of FIG. 5A as viewed from slightly above the eye level of a driver.

Next, the switch device in the second embodiment which is used as a vehicle switch device and is mounted on a vehicle's steering wheel will be described. However, it is obvious that the switch device in the first embodiment is also applicable as a vehicle switch device and can be mounted on a vehicle's steering wheel.

A steering wheel 300 of a vehicle is generally composed of a ring portion 301, a boss portion 302 with a rotating center of the steering, and spoke portions 303 coupling the ring portion 301 to the boss portion 302.

As shown in FIG. 5A, a vehicle switch device 150 is mounted on the spoke portion 303. The vehicle switch device 150 is arranged at a position allowing a driver to perform a switch operation mainly by a finger/thumb while holding the ring portion 301 with a hand and serves as a switch device in a vehicle.

The vehicle switch device 150 mounted on the spoke portion 303 shown in FIGS. 5A and 5B is supposed to be used such that a driver holding the ring portion 301 performs a push operation on the first push portion 111, the second push portion 112 and the third push portion 113 or a toggle operation in the direction C on the operating switch 200 by mainly using the left thumb.

Figure 6A:
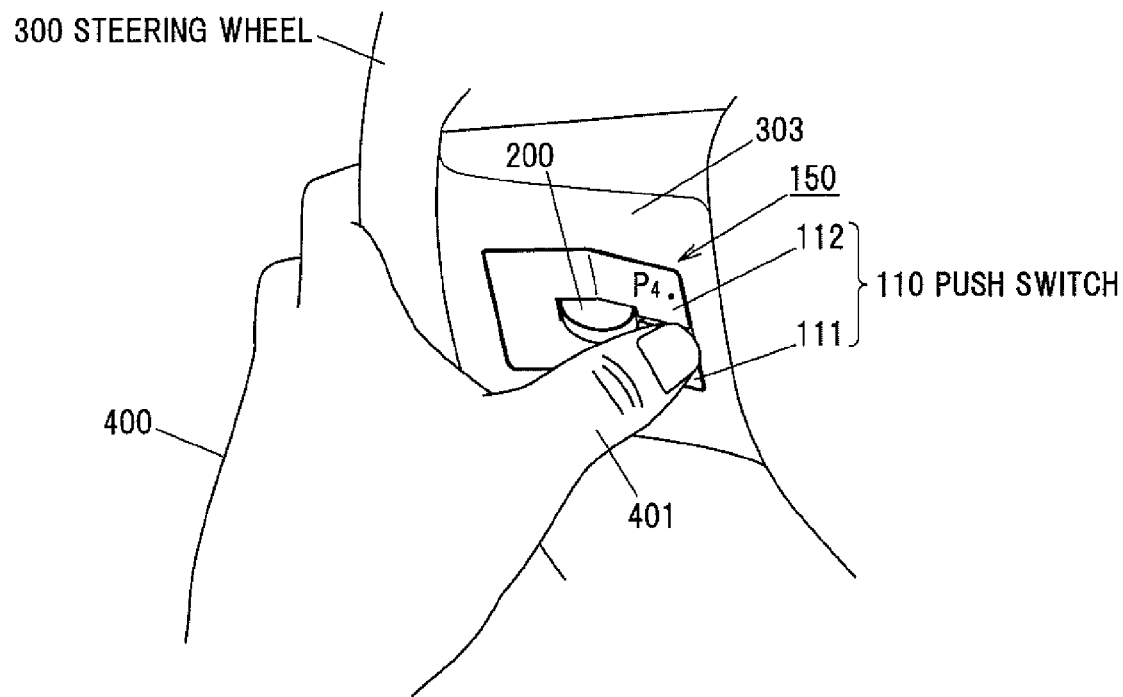
FIG. 6A is an illustration diagram showing a situation in which a point $P_3$ of the vehicle switch device is push-operated.
Figure 6B:
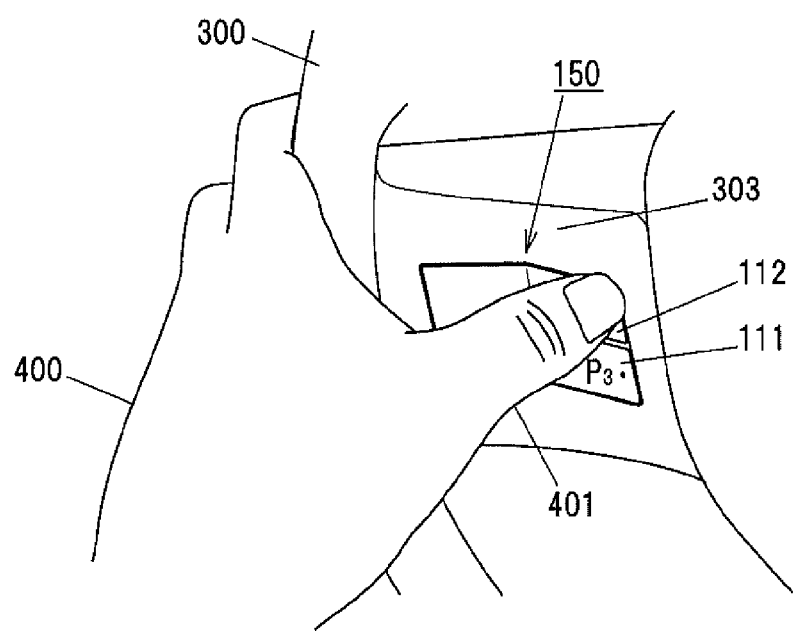
FIG. 6B is an illustration diagram showing a situation in which a point $P_4$ of the vehicle switch device is push-operated.

FIG. 6A is an illustration diagram showing a situation in which the point $P_3$ of the vehicle switch device is push-operated and FIG. 6B is an illustration diagram showing a situation in which the point $P_4$ of the vehicle switch device is push-operated.

The driver can perform a push operation on the first push portion 111 (the point $P_3$) of the vehicle switch device 150 by using a left thumb 401 while holding the ring portion 301 with a hand 400, as shown in FIG. 6A. When performing this operation, the first push portion 111 and the second push portion 112 can be recognized separately since the operating switch 200 protrudes from between the first push portion 111 and the second push portion 112 and it is thus possible to perform a push operation on the point $P_3$ of the first push portion 111 without performing incorrect operation.

The driver can perform a push operation on the second push portion 112 (the point $P_4$) of the vehicle switch device 150 by using the left thumb 401 while holding the ring portion 301 with the hand 400, as shown in FIG. 6B. During this operation, the left thumb 401 needs to move over the operating switch 200 as a separator to push the second push portion 112 (the point $P_4$) of the vehicle switch device 150. Therefore, the first push portion 111 and the second push portion 112 can be recognized separately, allowing the point $P_4$ of the second push portion 112 to be push-operated correctly.

Meanwhile, the operating switch 200 as a separator is a toggle switch rocking in the direction C and is thus operated in a different direction from the operation direction of the push switch 110. As a result, the operation of the operating switch 200 is not confused with the operation of the push switch 110.

Effects of the Third Embodiment

The switch devices in the first and second embodiments are applicable as vehicle switch device and can be mounted on a vehicle's steering wheel. The vehicle switch device 150 can be arranged at a position allowing a driver to perform a switch operation mainly by a finger/thumb while holding the ring portion 301 with a hand. Since the operating switch 200 serves as a separator, the first push portion 111 and the second push portion 112 can be recognized separately and it is thus possible to perform a push operation on the point $P_3$ of the first push portion 111 and the point $P_4$ of the second push portion 112 without performing incorrect operation. The point $P_5$ of the third push portion 113 also can be push-operated without confusion with the first push portion 111 and the second push portion 112. The switch operations as described above can be performed without incorrect operation while driving a vehicle.

Although some embodiments of the invention have been described, the embodiments are merely an example and the invention according to claims is not to be limited thereto. These new embodiments may be implemented in various other forms, and various omissions, substitutions and changes, etc., can be made without departing from the gist of the invention. For example, the switch device in the first or second embodiment applied as a vehicle switch device is mounted on the left spoke portion of the vehicle's steering wheel in the third embodiment, but can obviously be mounted on the right spoke portion of the steering wheel. In addition, all combinations of the features described in the embodiments are not necessary to solve the problem of the invention. Further, the embodiments are included within the scope and gist of the invention and also within the invention described in the claims and the range of equivalency.

What is claimed is:

1. A switch device, comprising:
   a push switch comprising first and second push portions that are parallel arranged and pivotally movable; and
   an operating switch arranged between the first and second push portions and having only a switch operation direction different from a switch operation direction of the first and second push portions,
   wherein the operating switch protrudes from an operation surface of the first and second push portions so as to allow the first and second push portions to be individually recognized when operating the push switch.

2. The switch device according to claim 1, wherein the first and second push portions define a portion or an entirety of a U-shaped operational area, and wherein the operating switch is arranged in the U-shaped operational area.

3. The switch device according to claim 2, wherein the operational area comprises the first and second push portions parallel arranged and a third push portion arranged opposite the first and second push portions in relation to the operating switch.

4. The switch device according to claim 1, wherein the operating switch comprises a toggle switch.

5. A vehicle switch device, comprising:
   the switch device according to claim 1; and
   a fixing part by which the switch device is attached to a spoke portion of a steering wheel.

6. The switch device according to claim 1, wherein an axis of rotation of the pivotal switch operation direction of the first and second push portions is substantially perpendicular to the switch operation direction of the operating switch.

7. The switch device according to claim 1, wherein the first and second push portions are separated from each other by a linear groove, and wherein the protrusion of the operating switch extends along the groove.

8. The switch device according to claim 7, wherein the first and second push portions have a same width in a direction orthogonal to an extension direction of the groove.

9. The switch device according to claim 7, wherein the protrusion of the operating switch is arranged in the groove.

10. A switch device, comprising:
   a push switch comprising first and second push portions that are parallel arranged; and
   an operating switch arranged between the first and second push portions and a switch operation direction different from a switch operation direction of the first and second push portions,
   wherein the operating switch protrudes from an operation surface of the first and second push portions so as to allow the first and second push portions to be individually recognized when operating the push switch,
   wherein the first and second push portions include first and second plate portions that are rotatably mounted to a housing so as to be pivotable about a first axis, and
   wherein the operating switch is rotatably mounted to the housing so as to be pivotable about a second axis that is substantially orthogonal to the first axis.

11. The switch device according to claim 10, wherein the first and second plate portions are not connected to one another such that the first and second push portions are independently operable.

12. The switch device according to claim 10, wherein the first and second plate portions are connected to one another at a first end and are not connected to one another at a second end such that the first and second push portions are independently operable at the second end but are not independently operable at the first end.

* * * * *